March 21, 1950     R. F. WANDELT     2,501,366
HEATING POT
Filed Jan. 12, 1949
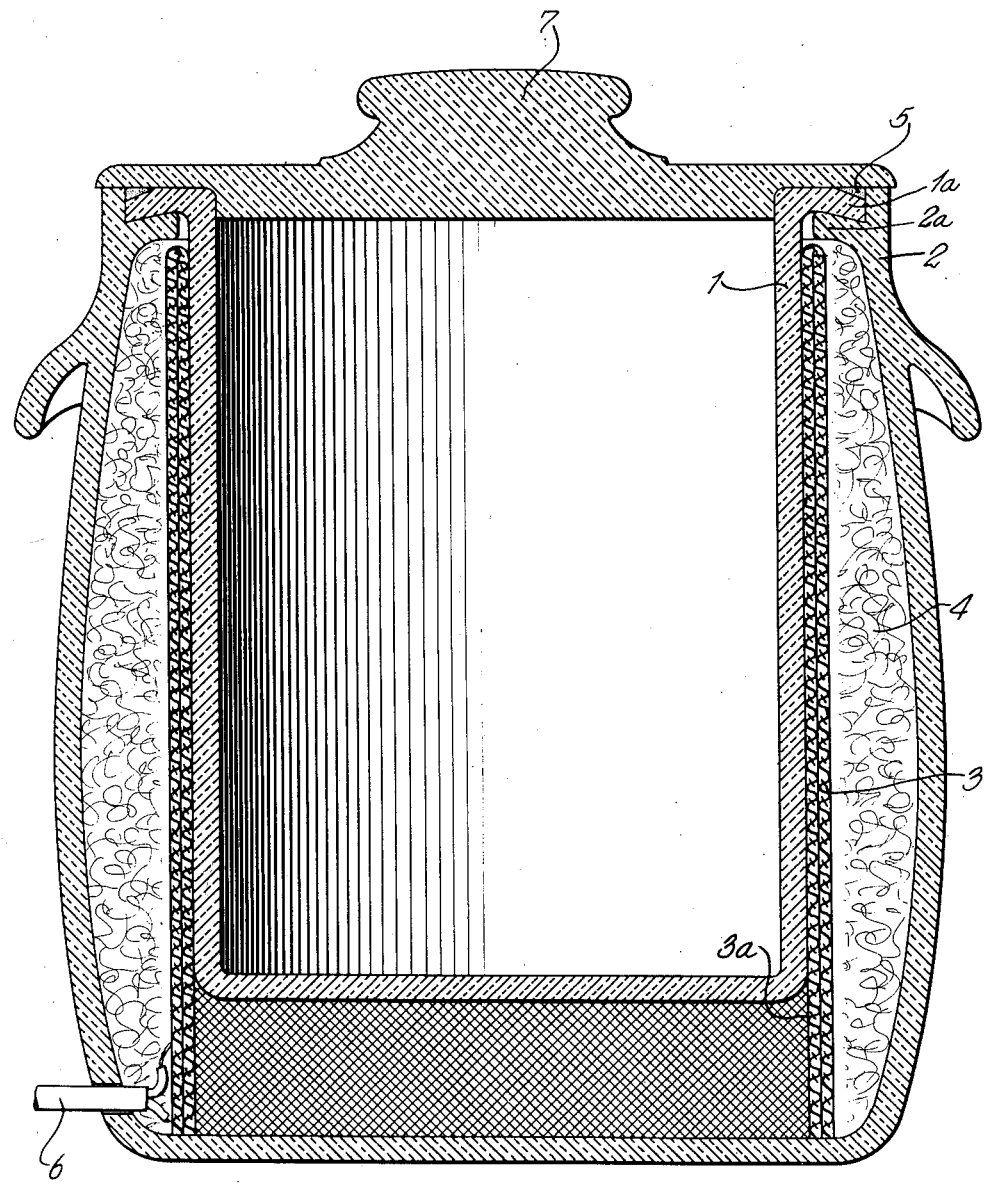
INVENTOR.
RICHARD F. WANDELT
BY
Kenyon & Kenyon
ATTORNEYS Patented Mar. 21, 1950

2,501,366

UNITED STATES PATENT OFFICE 2,501,366

HEATING POT

Richard F. Wandelt, Gladstone, N. J.

Application January 12, 1949, Serial No. 70,558

1 Claim. (Cl. 219—44)

This invention relates to heating pots of the type comprising inner and outer containers having relatively spaced walls with the wall of the inner pot heated by electric resistance heating elements and with thermal insulation packed around these elements between them and the wall of the outer container.

Devices of the above type are particularly adapted for slow cooking food although they may be used for other purposes. They work on the principle of continually putting a small amount of heat into the inner pot with the thermal insulation storing this heat so it accumulates and results in temperatures high enough to cook food in a slow manner.

In attempting to bring the side and bottom walls of the inner container to the same uniform temperature, the prior art has taught the use of thermal insulation in the space between the two bottoms of the containers and sometimes the use of heating elements placed against the bottom of the inner container. However, these expedients have not worked out in practice and a defect of the described type of heating pot has heretofore been the existence of relatively large temperature differentials between the bottom and side walls of the inner container. This is undesirable because devices of this type are subjected to operation for periods of hours without attendance and during which the contents of the inner pot are not regularly stirred. Therefore there is a decided tendency either towards burning the food locally or under cooking it locally if all the inner container walls are not uniform in temperature.

The object of the present invention is to provide a heating pot of the described type and which overcomes the above described defect. Another object is to provide a pot which can be manufactured relatively inexpensively yet which will be absolutely reliable when placed in service and will provide a uniformly heated inner container for receiving the food or other material to be heated.

What is now considered the best form of the invention is illustrated by the accompanying drawing showing the device in cross section and which form is described as follows with the aid of this drawing.

According to the present invention the described type of heating pot is made with superimposed inner and outer containers 1 and 2 respectively. These containers have relatively spaced side and bottom walls with an electric resistance heating wall 3 closely encircling the inner container side wall to heat it largely or entirely by conduction. Thermal insulation 4 is arranged between this heating wall and the side wall of the outer container 2.

The invention diverges from the prior art in that the electric resistance heating wall 3 depends all the way down to the outer container bottom wall as at 3a to radiate heat into the space between the two containers' bottom walls to the inner container bottom wall to heat it largely by radiation. A further distinguishment is that the space between the two bottom walls is maintained free from anything preventing the heat radiation therein.

In operation the electric resistance heating wall 3 heats the side wall of the inner container in the usual fashion with the thermal insulation 4 preventing radiation losses outwardly. But the bottom of the inner container is heated in a different fashion than is usual in that the heat radiates from the depending or bottom portion 3a of the heating wall both directly to the bottom wall of the inner container and to the bottom wall of the outer container. The radiant heat reflects back and forth between these walls and it is the direct and reflected radiant heat that heats the bottom wall of the inner container. It has been discovered that this provides the bottom wall of the inner container with a temperature substantially equaling that which the side wall of the inner container normally attains.

Preferably both the inner container 1 and the outer container 2 are made from ceramic material. The material may be of the character used to make old fashion, ceramic bean pots, and if desired the outer container 2 may be given the shape of such a bean pot. Preferably the two containers are circular in cross section in any event. But both bottom walls of the superimposed containers are preferably relatively flat as illustrated. This provides two flat disks between which the radiant heat may reflect back and forth so as to bring this space beneath the inner container bottom wall to a relatively high temperature which attains an intensity heating the bottom wall of the inner container by its radiation to substantially the same temperature the inner container side wall is heated by conduction. It is to be understood that the wall 3 should hug the side wall of the inner container 1 to facilitate conduction heating.

Preferably the heating wall 3 and its depending portion 3a, the two parts being integral, is formed from interwoven fiberglass threads and electric resistance heating wire. This material is generally known as heater cloth. It is in the nature of a blanket which may be wrapped around the inner container 1 with its lower peripheral portion depending to provide the portion 3a. Also the thermal insulation preferably comprises fiberglass wool. This type of construction permits economies in connection with assembling the heating pot, makes the device absolutely safe and renders the device permanently trouble free. Preferably the upper peripheries of the side walls of the two containers are provided with inwardly and outwardly extending flanges 1a and 2a, intercemented by a good permanently waterproof cement 5. The necessary powering cable 6 may pass through a hole in the bottom of the side wall of the outer container 2 and be sealed therethrough by a permanent sealing material. When the device is made in the preferred manner the dimensions indicated by the drawing provide the described uniform heating when the heater cloth is wrapped uniformly around the inner container 1 to form a uniform wall with an input capacity of about 60 watts when operating on ordinary 110 to 120 volt house current. This is using the fiberglass insulation and with the inner and outer containers made of the ceramic material commonly used for domestic kitchen pots of various types.

A ceramic lid 7 provides adequate thermal insulation for the container when given the proportions illustrated. This does not provide enough thermal insulation to prevent some cooling of the lid which is considered of advantage in that it causes vapors rising from food within the pot to condense on its undersurface and drop back into the pot. This prevents loss of liquid from the contents of the pot during prolonged cooking cycles.

It is to be understood that the fiberglass heating cloth has the fiberglass threads interwoven and supporting the electric resistance heating element which comprises a suitable wire covered by an electrically insulating layer of fiberglass thread and looped back and forth in the cloth. This product is flexible and is very foolproof when operated at the relatively low temperatures required by the present invention.

I claim:

A heating pot comprising superimposed inner and outer ceramic containers having relatively spaced circular side and flat bottom walls, and with a heating wall formed from interwoven fiberglass threads and electric resistance heating wire wrapped around and in contact with the inner container side wall and depending therefrom to the bottom wall of the outer container and with the space between said heating wall and the outer container side wall filled with fiberglass wool to provide thermal insulation, the ceramic flat bottom walls of said containers being spaced apart a substantial distance so that radiant heat may be projected from the depending portion of said heating wall into the space between said bottom walls for reflection back and forth therein to heat the bottom wall of the inner container to substantially the same temperature its side wall is heated due to the latter's contact with said heating wall, said containers being interconnected at their top peripheries and sealed, and said pot being provided with a ceramic lid proportioned to permit adequate cooling of said lid by the outside atmosphere to cause vapors rising from liquids within the inner container to condense on the undersurface of the lid and drop back into the inner container.

RICHARD F. WANDELT.

REFERENCES CITED

The following references are of record in the file of this patent:

UNITED STATES PATENTS

| Number | Name | Date |
|---|---|---|
| 756,242 | Kuhn | Apr. 5, 1904 |
| 1,033,799 | Harvey | July 30, 1912 |
| 1,983,118 | Bourque | Dec. 4, 1934 |
| 2,074,985 | Hofferbert | Mar. 23, 1937 |
| 2,140,952 | Clifford | Dec. 20, 1938 |
| 2,159,876 | Lacy, Jr. | May 23, 1939 |